(12) United States Patent
O'Coin et al.

(10) Patent No.: US 10,035,098 B2
(45) Date of Patent: Jul. 31, 2018

(54) CARTRIDGE FOR MOUNTING LITHIUM HYDROXIDE SHEETS

(71) Applicant: Hamilton Sundstrand Corporation, Charlotte, NC (US)

(72) Inventors: James R. O'Coin, Somers, CT (US); Leonard P. Senofonte, Simsbury, CT (US); Elliot I. Jung, West Hartford, CT (US); Gennaro Bonfiglio, Longmeadow, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 174 days.

(21) Appl. No.: 15/180,429

(22) Filed: Jun. 13, 2016

(65) Prior Publication Data

US 2017/0354915 A1    Dec. 14, 2017

(51) Int. Cl.
*B01D 53/04* (2006.01)
*F24F 3/16* (2006.01)
*B01J 20/04* (2006.01)
*B64G 1/48* (2006.01)
*B63G 8/36* (2006.01)

(52) U.S. Cl.
CPC ........ *B01D 53/0415* (2013.01); *B01J 20/041* (2013.01); *B63G 8/36* (2013.01); *B64G 1/48* (2013.01); *F24F 3/1603* (2013.01); *B01D 2253/1122* (2013.01); *B01D 2257/504* (2013.01); *B01D 2257/80* (2013.01); *B01D 2259/4575* (2013.01); *F24F 2003/1614* (2013.01)

(58) Field of Classification Search
CPC ........ B01D 53/0415; B01D 2253/1122; B01D 2253/1124; B01D 2253/1126; B01D 2257/504; B01D 2257/80; B01D 2259/4575; B01J 20/041; B63G 8/36; B64G 1/48; F24F 3/1603; F24F 2003/1614; F24F 2003/1621
See application file for complete search history.

(56) References Cited

U.S. PATENT DOCUMENTS

| | | | |
|---|---|---|---|
| 5,964,221 A | 10/1999 | McKenna | |
| 6,139,609 A | 10/2000 | Eimer et al. | |
| 7,089,933 B2 | 8/2006 | Goldblatt et al. | |

(Continued)

FOREIGN PATENT DOCUMENTS

DE    2839368 A1    3/1980

OTHER PUBLICATIONS

European Search Report for European Application No. 17173767.9 dated Oct. 17, 2017.

*Primary Examiner* — Timothy C Cleveland
(74) *Attorney, Agent, or Firm* — Carlson, Gaskey & Olds, P.C.

(57) ABSTRACT

A cartridge mounting an air treatment material is a housing defining a housing in a perimeter. The air treatment material is received within the housing, and spaced from the inner wall of the housing by a plurality of resilient sheets. There is an inlet direction into the housing for air flowing across the air treatment material and an outlet opening on an opposed side of the housing. There are top and bottom surfaces and side surfaces forming a perimeter about the air treatment material. The resilient sheets extend substantially continuously across the side surfaces and the top and bottom surfaces at least at the inlet end to increase airflow across the air treatment material. An enclosed inhabited space is also disclosed and claimed.

12 Claims, 3 Drawing Sheets

(56) References Cited

U.S. PATENT DOCUMENTS

| | | |
|---|---|---|
| 7,329,307 B2 | 2/2008 | Hrycak et al. |
| 8,685,153 B2 | 4/2014 | McKenna et al. |
| 9,266,054 B2 | 2/2016 | McKenna et al. |

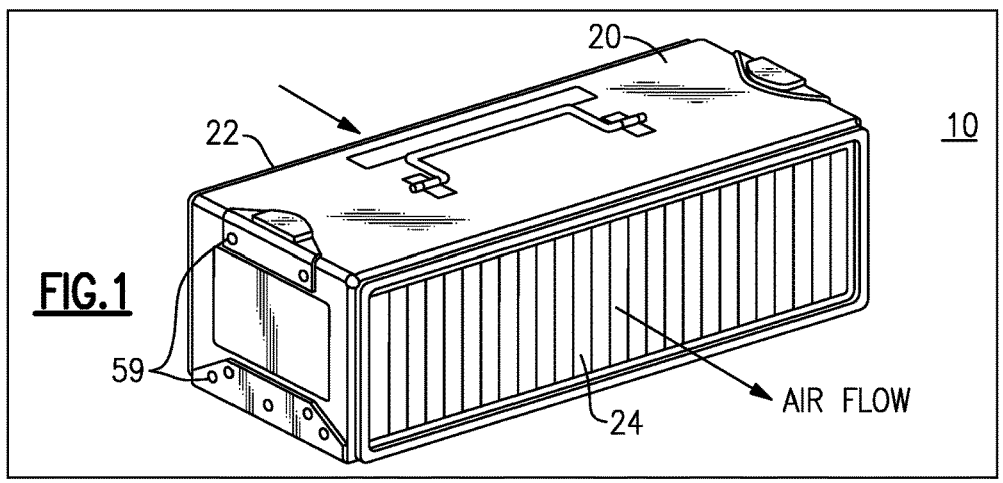
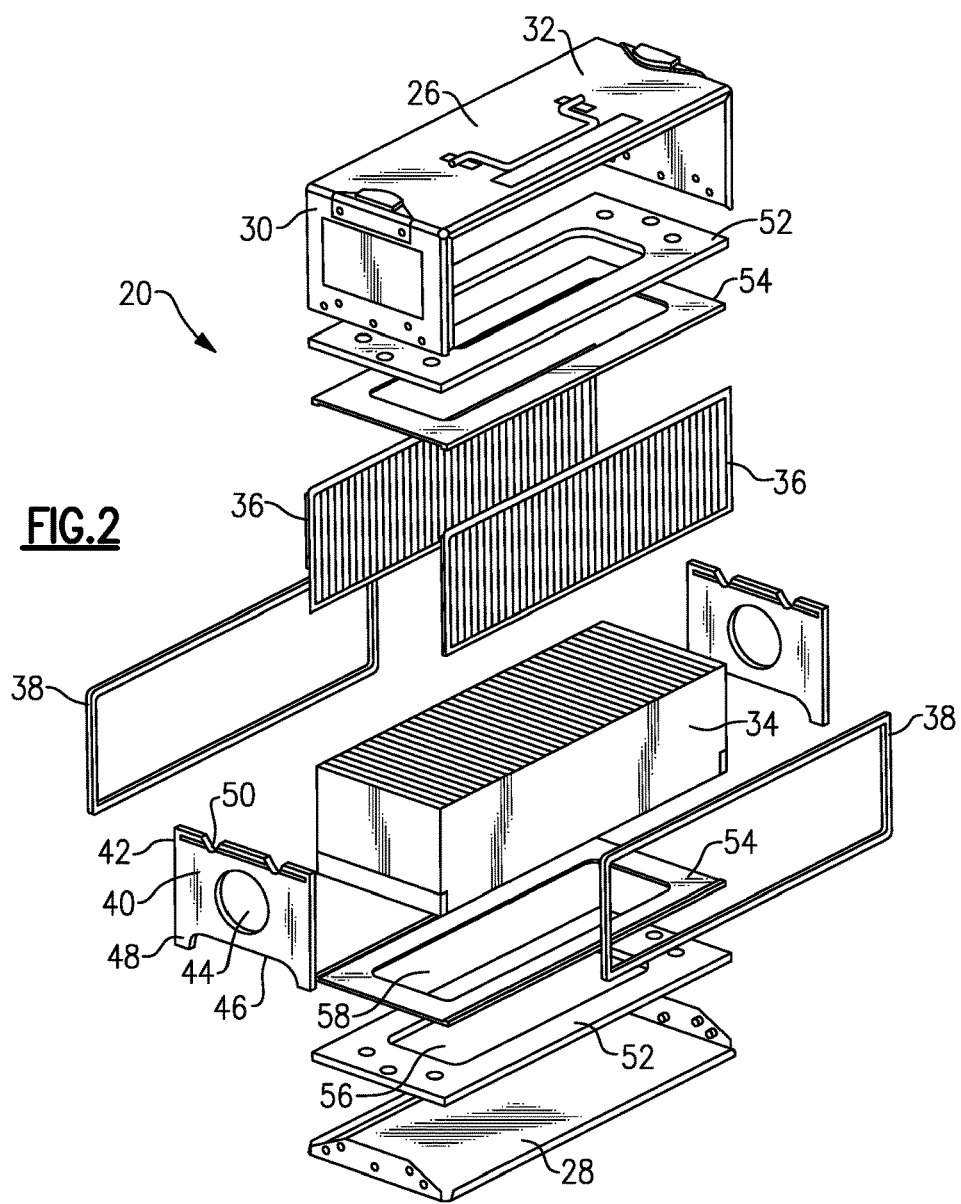

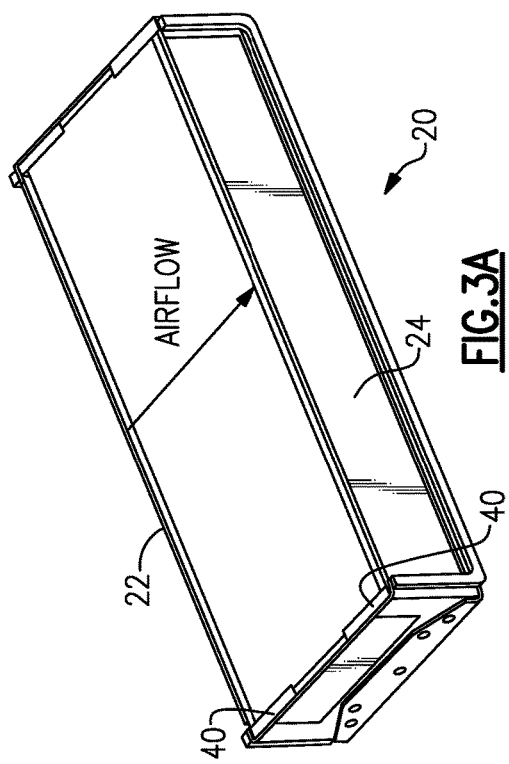
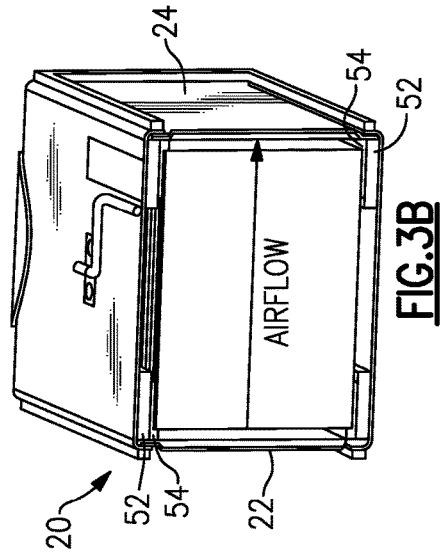
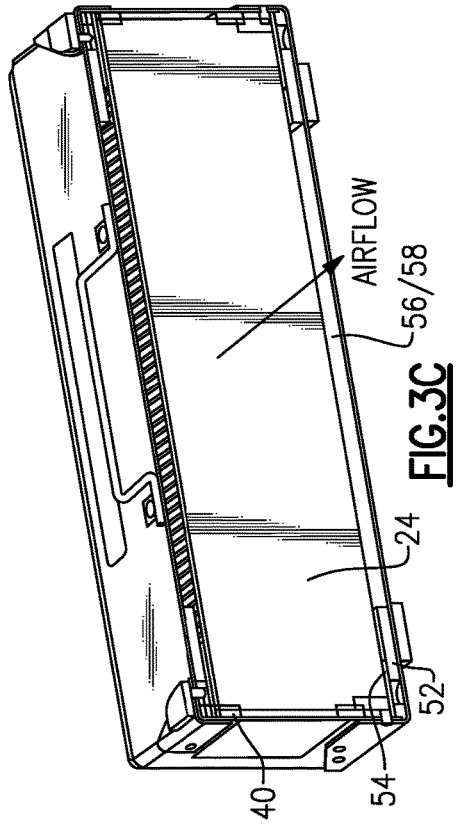

CARTRIDGE FOR MOUNTING LITHIUM HYDROXIDE SHEETS

BACKGROUND OF THE INVENTION

This application relates to a housing cartridge for mounting lithium hydroxide sheets.

It is known to utilize lithium hydroxide to remove carbon dioxide from air in inhabited closed environments. As an example, lithium hydroxide is utilized in space capsules or submarines.

The air from the closed environment is passed across the lithium hydroxide and carbon dioxide is absorbed. Lithium hydroxide is available in different forms. In particular, it can be obtained in granular form or sheet form.

As the lithium hydroxide absorbs carbon dioxide, it also absorbs water and expands or swells.

Housings for containing lithium hydroxide thus have several challenges.

SUMMARY OF THE INVENTION

A cartridge mounting an air treatment material has a housing. The air treatment material is received within the housing, and spaced from inner walls of the housing by a plurality of resilient sheets. There is an inlet direction into the housing for air flowing across the air treatment material and an outlet opening on an opposed side of the housing. There are top and bottom surfaces and side surfaces forming a perimeter about the air treatment material. The resilient sheets extend substantially continuously across the side surfaces and the top and bottom surfaces at least at the inlet end to increase airflow across the air treatment material.

An enclosed inhabited space is also disclosed and claimed.

These and other features may be best understood from the following drawings and specification.

BRIEF DESCRIPTION OF THE DRAWINGS

FIG. 1 schematically shows an environment containing a lithium hydroxide cartridge.

FIG. 2 is an exploded view of the cartridge.

FIG. 3A is a horizontal cross section view.

FIG. 3B is a vertical cross section view from an inlet to an outlet.

FIG. 3C is a vertical cross section view from side to side.

DETAILED DESCRIPTION

Figure 4:
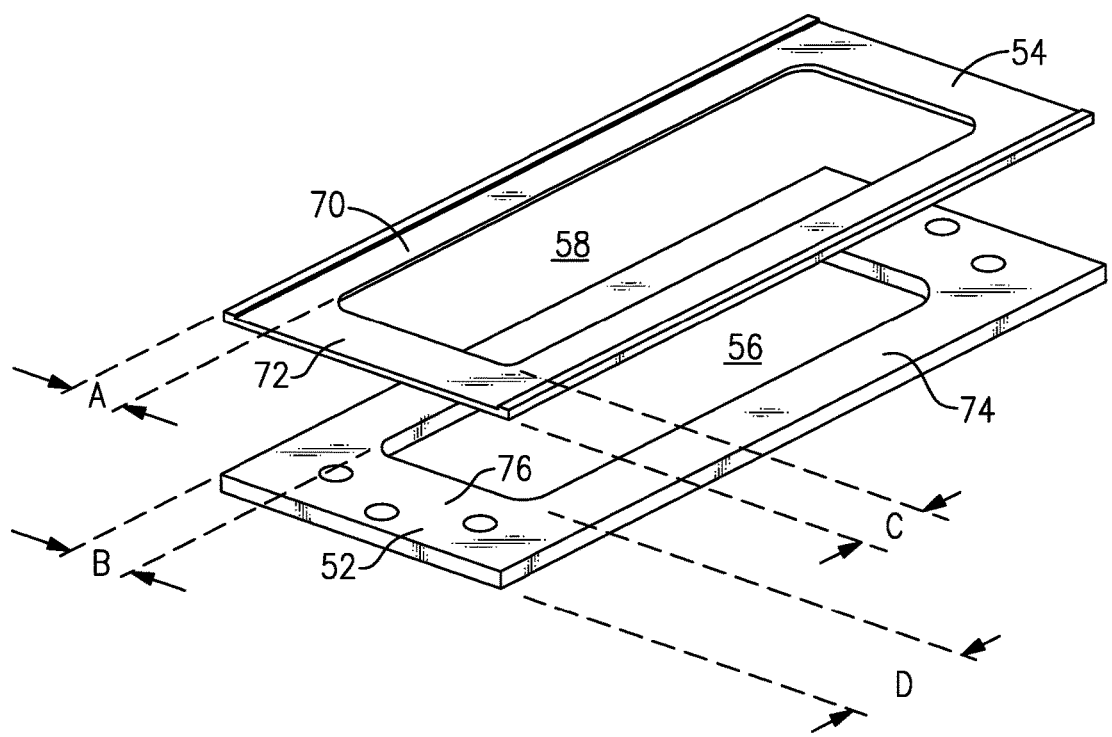
FIG. 4 shows geometric details.

An enclosed environment 10 is illustrated in FIG. 1. The enclosed environment, which is inhabited, typically must have carbon dioxide removed from breathing air. Examples of an enclosed and inhabited environment 10 may be a space capsule or a submarine. Thus, a cartridge 20 containing a plurality of lithium hydroxide sheets receives airflow through an inlet 22, and the air passes outwardly through an outlet 24. Of course, conduits, etc. may be utilized to properly direct the air as desired.

The lithium hydroxide sheets may be those available from Micropore, Inc. of Elkton, Md.

There are challenges with the lithium hydroxide sheets as mentioned above. The size of the sheets increases or swells as the absorption of carbon dioxide and water occurs. Thus, there must be room to accommodate expansion. On the other hand, the efficiency is highest when all air passing into the cartridge 20 must pass across the sheets.

FIG. 2 is an exploded view of details of the cartridge 20, which includes spring structure for accommodating expansion of the sheets while still maximizing the flow of air across the sheets. A main housing 26 is secured to a bottom housing 28. The main housing has sidewalls 30 and a top wall 32 enclosing the cartridge. A stack 34 contains a plurality of lithium hydroxide sheets. Screens 36 are placed on the inlet and outlet surfaces 22 and 24. Gaskets 38 are placed outwardly of the screens 36.

A plurality of resilient sheets provides springs that allow expansion of the sheets in stack 34 during operation. On the other hand, the resilient sheets also seal within the housing 26/28, such that the air delivered into the inlet 22 is delivered across the sheets in stack 34. The resilient sheets may be foam in one embodiment.

In one embodiment, the sheets may be formed of closed cell silicone foam.

Side foam sheets 40 are positioned at each side. As shown, at edges 42, the foam side sheets 40 will extend along the entire height of the stack 34. On the other hand, there is a central cutout 44, a bottom cutout 46, and top cutout 50. The central cutout 44 reduces the amount of foam surface area and allows control of the spring force resisting expansion in a side direction. In this embodiment, the bottom cutout 46 and the top cutout 50 provide clearance relief for fasteners 59. As also shown, there are outer foam sheets 52 and inner foam sheets 54. At the edges, the foam sheets 52 and 54 are solid, thus, providing a complete seal in combination with the sides 42 of the side foam pieces 40. However, foam sheets 52 and 54 each have respective central cutouts 56 and 58. As can be appreciated from this view, the cutouts 58 may be significantly larger than the cutouts 56.

The foam sheet 52 may also be thicker than the foam sheet 54. In addition, the foam material for sheet 52 may have a higher density than that for sheet 54. By properly selecting the respective sizes of the openings 56/58, the densities, along with potentially selecting different foams, the spring force from the two sheets 52 and 54 can be controlled.

The cutouts provide significantly continuous sealing at the perimeter to limit bypass flow. However, the cutouts provide lesser support at more central areas where the housing is less stiff than it is at the perimeter. This facilitates the expansion of the sheets without distorting the housing top 32, the housing sides 30 and the housing bottom 28.

FIG. 3A shows a cross section of the cartridge 20 with the top half removed. As can be seen, the side pieces 40 provide sealing at the inlet and outlet ends.

FIG. 3B shows the pieces 52 and 54 providing sealing at the upper and lower extremes of the inlet and outlet ends.

FIG. 3C shows the cutouts 56 and 58, pieces 52 and 54, and the side pieces 40.

Thus, there is a substantially continuous seal along the entire perimeter of the sheet stack 34. By "substantially," this application means that there is foam sheet material intended to be across the entire perimeter of the stack at least at the inlet end. There may be some small gap inadvertently left or designed into the perimeter, as long as there is sealing coverage that forces the majority of the air flow through the stack 34 of lithium hydroxide sheets. In another embodiment, "substantially" may be met if there is sealing coverage around 75% of the perimeter.

FIG. 4 shows the design features as mentioned above. As shown, sheet 52 has side portions 76 and crossing legs 74. Sheet 54 has side portions 72 and crossing legs 70. Crossing legs 70 extend for a distance A and crossing legs 74 extends for a distance B. As illustrated, these dimensions are different. Again, this allows achieving a specific relationship between the spring forces of the two sheets 52 and 54. Similarly, the side portion 72 extends for a thickness C while the side portion 76 extends for a distinct thickness D. In embodiments, the inner sheet 54 and its dimension A is less than dimension B and the dimension C is also less than the dimension D. This provides a lesser spring force adjacent the stack than is found adjacent the housing in the outer sheet 52. In other embodiments these dimensions could be the same or could be reversed depending on how the spring force needs to be applied between the stack 34 and the surrounding housing 26.

This disclosure might be summarized as a cartridge 20 mounting an air treatment material 34 that has a housing. Air treatment material 34 is received within the housing, and spaced from inner walls of the housing by a plurality of resilient sheets. There is an inlet direction 22 into the housing for air flowing across the air treatment material 34 and an outlet 24 opening on an opposed side of the housing. There are top and bottom surfaces and side surfaces forming a perimeter about the air treatment material 34. The resilient sheets extend substantially continuously across the side surfaces and the top and bottom surfaces at least at the inlet end to increase airflow across the air treatment material. It should be understood that the terms "top," "bottom," and "sides" are all relative to the airflow direction and imply nothing with regard to vertical positioning of the cartridge.

While the enclosure is shown including lithium hydroxide sheets, the disclosed housing may have benefits in housing other types of air treatment sheets.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cartridge mounting an air treatment material comprising:
   a housing;
   air treatment material received within said housing, said air treatment material being designed to remove carbon dioxide from breathing air, and spaced from inner walls of said housing by a plurality of resilient sheets, said resilient sheets being positioned within said housing;
   there being an inlet direction into said housing for air flowing across said air treatment material and an outlet opening on an opposed side of said housing, and with there being top and bottom surfaces and side surfaces forming a perimeter about said air treatment material, and said resilient sheets extending substantially continuously across said side surfaces and said top and bottom surfaces at least at an inlet end to increase airflow across said air treatment material;
   the resilient sheets are foam;
   said foam sheets at said top and bottom surfaces include a plurality of foam sheets;
   said plurality of foam sheets at said top and bottom surfaces have different spring forces;
   a first of said plurality of said foam sheets at said top and bottom surfaces, which is positioned adjacent said air treatment material, has a lower spring force than a second of said plurality of foam sheets at said top and bottom surfaces which is positioned on an opposed side of said first relative to said air treatment material;
   said first and second of said plurality of foam sheets at said top and bottom surfaces extend along crossing legs crossing between said sides, and side surfaces with a central cutout; and
   said air treatment material is lithium hydroxide.

2. The cartridge as set forth in claim 1, wherein said foam sheets also form a substantially continuous perimeter at an outlet side of said housing.

3. The cartridge as set forth in claim 1, wherein said central cutout in said first of said plurality of foam sheets at said top and bottom surfaces extends for a greater cross-sectional area than does said central cutout in said second.

4. The cartridge as set forth in claim 1, wherein said resilient sheets have cutout portions to result in lower spring force at positions spaced from said inlet end.

5. An enclosed inhabited space comprising:
   an enclosure to be inhabited by a living entity, and containing air, and a system for delivering said air across a cartridge containing air treatment material;
   a housing;
   air treatment material received within said housing, said air treatment material being designed to remove carbon dioxide from breathing air, and spaced from inner walls of said housing by a plurality of resilient sheets, said resilient sheets being positioned within said housing;
   there being an inlet direction into said housing for air flowing across said air treatment material and an outlet opening on an opposed side of said housing, and with there being top and bottom surfaces and side surfaces forming a perimeter about said air treatment material, and said resilient sheets extending substantially continuously across said side surfaces and said top and bottom surfaces at least at an inlet end to increase airflow across said air treatment material;
   said resilient sheets have cutout portions to result in lower spring force at positions spaced from said inlet end; and
   said air treatment material is lithium hydroxide.

6. The enclosed inhabited space as set forth in claim 5 wherein the resilient sheets are foam.

7. The enclosed inhabited space as set forth in claim 6, wherein said foam sheets also form a substantially continuous perimeter at an outlet side of said housing.

8. The enclosed inhabited space as set forth in claim 6, wherein said foam sheets at said top and bottom surfaces include a plurality of foam sheets.

9. The enclosed inhabited space as set forth in claim 8, wherein said plurality of foam sheets at said top and bottom surfaces have different spring forces.

10. The enclosed inhabited space as set forth in claim 9, wherein a first of said plurality of said foam sheets at said top and bottom surfaces, which is positioned adjacent said air treatment material, has a lower spring force than a second of said plurality of foam sheets at said top and bottom surfaces which is positioned on an opposed side of said first relative to said air treatment material.

11. The enclosed inhabited space as set forth in claim 5, wherein said enclosed space is a space capsule.

12. The enclosed inhabited space as set forth in claim 5, wherein said enclosed space is a submarine.

* * * * *